(12) United States Patent
Bianchi

(10) Patent No.: US 10,508,667 B2
(45) Date of Patent: Dec. 17, 2019

(54) HINGE CLAMP FOR A BICYCLE FRAME AND OTHER STRUCTURES

(71) Applicant: Stephan Bianchi, Santa Cruz, CA (US)

(72) Inventor: Stephan Bianchi, Santa Cruz, CA (US)

( * ) Notice: Subject to any disclaimer, the term of this patent is extended or adjusted under 35 U.S.C. 154(b) by 225 days.

(21) Appl. No.: 15/488,426

(22) Filed: Apr. 14, 2017

(65) Prior Publication Data

US 2017/0298967 A1    Oct. 19, 2017

Related U.S. Application Data

(60) Provisional application No. 62/323,125, filed on Apr. 15, 2016.

(51) Int. Cl.
*F16B 2/06* (2006.01)
*B62K 15/00* (2006.01)

(52) U.S. Cl.
CPC ............ *F16B 2/065* (2013.01); *B62K 15/006* (2013.01)

(58) Field of Classification Search
CPC ........................ B62K 15/006; B62K 2015/001; B62K 21/24; Y10T 403/32409; Y10T 403/595; Y10T 403/593; Y10T 403/591; F16B 7/04; F16B 2/185
See application file for complete search history.

(56) References Cited

U.S. PATENT DOCUMENTS

| | | | | |
|---|---|---|---|---|
| 3,345,092 A * | 10/1967 | Athman | ............. | F01N 13/1805 180/89.2 |
| 5,337,609 A * | 8/1994 | Hsu | ............. | B62K 15/006 280/278 |
| 5,440,948 A * | 8/1995 | Cheng | ............. | B62K 15/006 280/278 |
| 5,492,350 A * | 2/1996 | Pan | ............. | B62K 15/006 280/278 |
| 6,082,753 A * | 7/2000 | Kotlier | ............. | B62K 13/02 280/204 |
| 6,135,668 A * | 10/2000 | Lin | ............. | B62K 15/006 280/278 |
| 6,641,159 B1 * | 11/2003 | Fan | ............. | B62K 15/008 280/261 |
| 6,964,425 B2 * | 11/2005 | Turner | ............. | B62K 21/02 280/276 |
| 7,029,197 B2 * | 4/2006 | Lin | ............. | F16B 2/185 285/70 |
| 7,780,180 B2 * | 8/2010 | Hoepner | ............. | A61H 3/04 280/263 |
| 2004/0190984 A1 * | 9/2004 | Hon | ............. | B62K 15/006 403/322.4 |
| 2010/0135715 A1 * | 6/2010 | Huang | ............. | B62K 15/006 403/83 |
| 2014/0140756 A1 * | 5/2014 | Bettin | ............. | B62K 15/006 403/110 |

* cited by examiner

*Primary Examiner* — Daniel J Wiley
(74) *Attorney, Agent, or Firm* — Michael A. Guth

(57) ABSTRACT

A hinge clamp adapted to clamp a hinge assembly with an eyelet to position and protect a retraction spring, a counter-bore in the V-plate to accommodate the spring, and a finger loop to position the user's finger during operation. In some aspects the clamp may have a removable bolt tightening handle, the release of which enables the handle to be removed to avoid damage and to prevent theft. The handle may be removable over the head of the bolt in a first rotary configuration, and be constrained under the head of the bolt in a second rotary configuration. The hole in the clamp plate is counter-bored on the "V" side to accommodate a spring, which surrounds the bolt.

10 Claims, 4 Drawing Sheets

FIG. 4
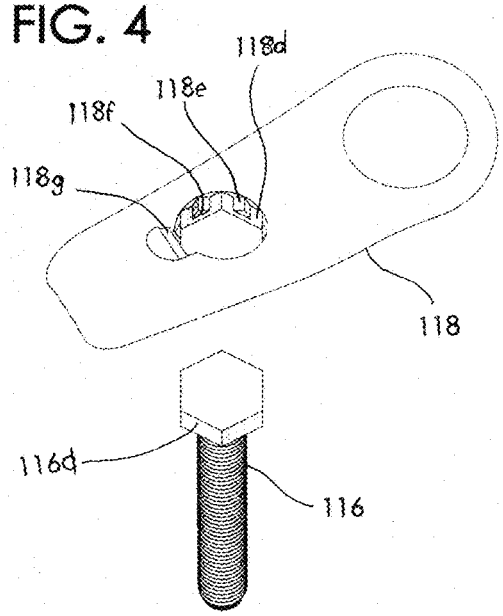
FIG. 5
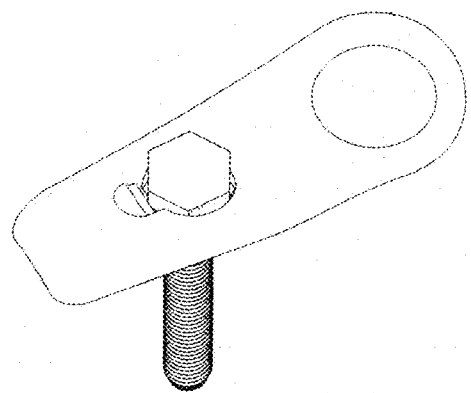
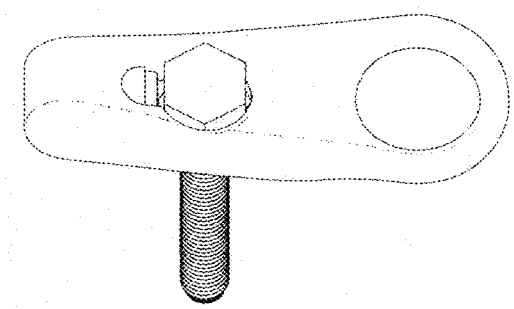
FIG. 7
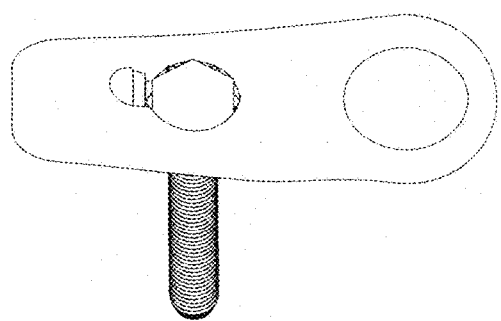
FIG. 6

HINGE CLAMP FOR A BICYCLE FRAME AND OTHER STRUCTURES

CROSS-REFERENCE TO RELATED APPLICATIONS

This application claim priority to U.S. Provisional Patent Application No. 62/323,125 to Bianchi, filed Apr. 15, 2016, which is hereby incorporated by reference in its entirety.

BACKGROUND

Temporary structures that need to be erected and folded for transportation and storage are often held together with hinges secured by integrated clamps. These clamps are more effective if they can be tightened and released quickly, easily and safely, and if the parts are not easily broken or lost.

This relates specifically to hinge clamps of folding bicycles and the like, but may also apply to hinge clamps that secure other structures. It may also apply to other clamps and other such mechanisms that have cranks or handles that can be spun by using a human finger or similar object inserted into a hole as an axis for spinning a crank.

Manufacturers offer bicycle frames that fold by way of hinges secured by clamps: two flanges or leaves are held together on one side by a pin running along the edges, and on the other side by a "V"-shaped clamp block or plate. The opening of the "V" is situated facing the pin and driven against surfaces along the open edges of the hinge. These surfaces are angled to mate with the angle of the "V". The "V" plate is wedged onto the edges of the hinge by tightening a bolt running through it. This bolt is affixed to one of the two leaves perpendicular to the axis around which the leaves rotate by means of a threaded bore. The bolt head is equipped with a winged member that acts as a wrench to be turned by hand, driving the parts firmly together. Friction keeps the structure together despite the jarring conditions of a bicycle ride. The inner surfaces of the "V" are relieved along the center to concentrate clamping force on the outer edges of the hinge to resist bending loads and to clear brazed fillets connecting the hinges to the tubing of the bicycle frame.

Disadvantages of this design are that the operation of opening and closing the mechanism is unnecessarily frustrating, as are other aspects of its service as described below.

The clamp plate may rotate into the path of the closing hinge, preventing closure. The plate is not automatically retracted when released, and may prevent opening even when unbolted. The travel of the bolt away from the hinge is not limited, so time may be wasted turning the bolt unnecessarily. In transit, the bolt is unconstrained by friction, so vibration can work the bolt out of its bore, subjecting it to deformation or loss. The wing bolt requires dexterity to spin it efficiently with one finger, or it requires the user to realign her or his hands with the handles at every turn. In addition, a thief can assemble the bicycle using the built-in wrenches and flee upon it.

Aftermarket manufacturers have improved on the original design by elongating one arm of the "V" to engage the leaf holding the bolt, preventing its rotation. One manufacturer has instead engaged the steel leaf by inserting magnets into either end of one side of the clamp plate. This approach is unnecessarily costly to produce and has the disadvantage of collecting ferrous debris that might compromise the solidity of the joint.

Some upgrade kits provide springs positioned around the bolt between the clamp plate and the bolt-bearing leaf to urge them apart when the bolt is loosened. Springs may be long and narrow to fit in the groove around the bolt, or short and wide to fit outside of the hinges when closed. In either case, there is a tendency for the springs to be caught between the leaves when the bolt is tightened, causing damage to the spring and preventing a safe, secure joint.

Some kits provide longer bolts and nuts to prevent the bolts from turning more than necessary, allowing precise adjustment to limit turning time and loss or damage to bolts. Others provide screws than can be screwed into the end of the bolts. This is self-limiting, but may not provide the optimum range for every clamp.

SUMMARY

A clamp with an eyelet to position and protect a retraction spring, a counter-bore in the V-plate to accommodate the spring, and a finger loop to position the user's finger during operation. In some aspects the clamp may have a removable bolt tightening handle, the release of which enables the handle to be removed to avoid damage and to prevent theft. The hole in the clamp plate is counter-bored on the "V" side to accommodate a spring, which surrounds the bolt. The bolt is inserted into a flanged tube, or eyelet, with the flange between the tube and the spring—that is, the tube fits into the grooves between hinge leaves and the bolt, preventing the thicker spring from entering that space and getting caught. This spring, with its diameter unconstrained by the hinges, may be thicker and more durable than current springs. It may also exert more pressure on the clamp plate, urging it away from the hinge when released and also preventing it from turning. The tube of the eyelet, constrained by the bolt, keeps the eyelet flange from tilting. The eyelet flange, constrained by the passive hinge leaf, keeps the spring out of the way of the moving hinge leaf. Additionally, the design provides for easy removal and repositioning of the handle. The handle may easily be removed from the bolt without having to remove the locknut and bolt and having to readjust the locknut upon reinstallation.

DRAWINGS

FIG. 4 shows the handle about to be pressed onto the head of the bolt.

FIG. 5 shows the handle with its grooves pressed just past the head of the bolt.

FIG. 6 shows the handle rotated 30° around the head of the bolt.

FIG. 7 shows the handle withdrawn so as to capture the bolt head in the blind grooves.

DETAILED DESCRIPTION

Figure 1:
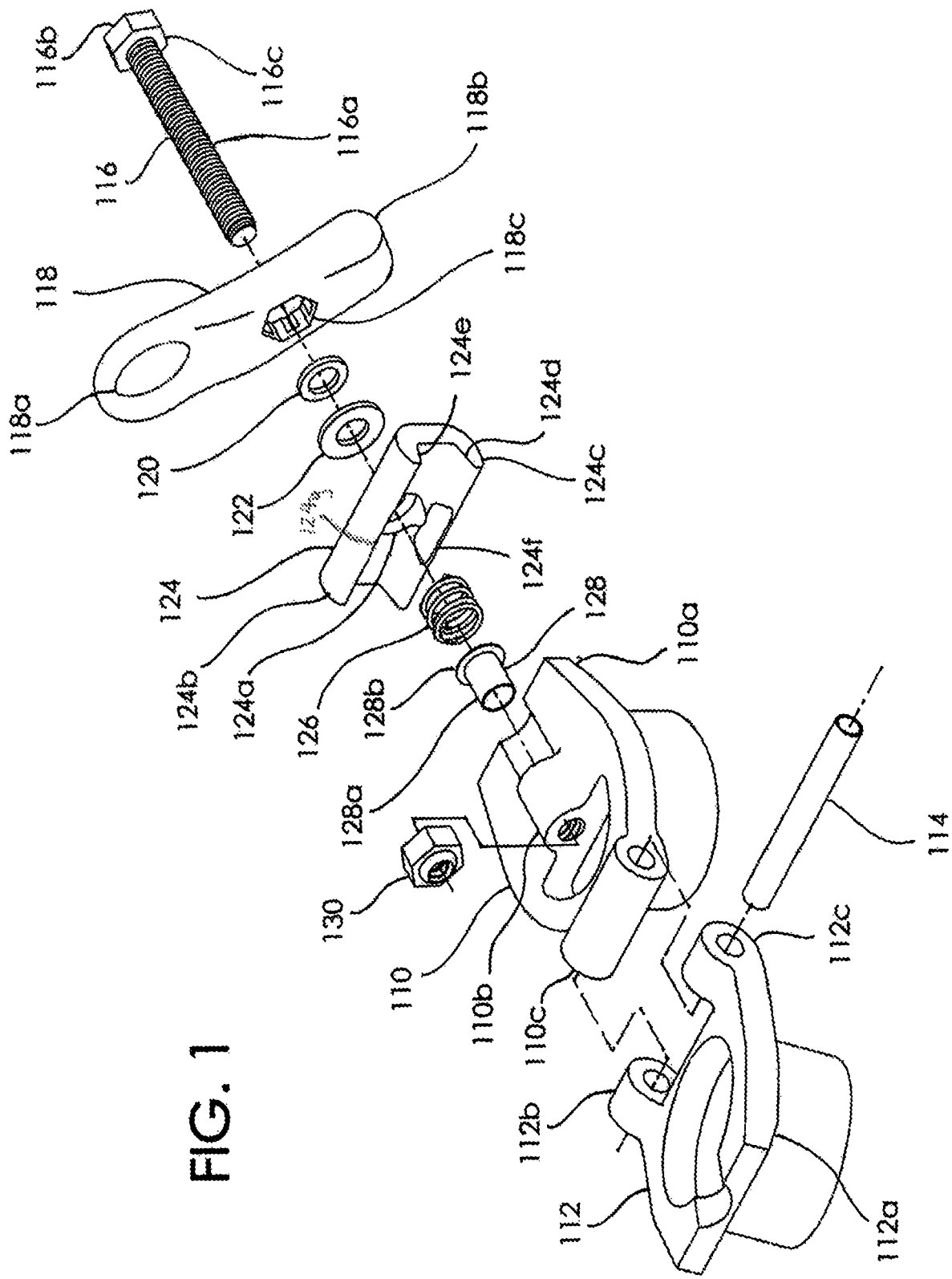
FIG. 1 is an exploded view of a hinge clamp in the open position.

In some embodiments of the present invention, as seen in FIG. 1, a clamp assembly is adapted to clamp in place a hinge assembly. The hinge assembly may have a passive hinge flange or leaf 110, having a passive bored lobe or barrel 110c, a passive leaf chamfer 110a which is parallel to the barrel, a threaded bolt barrel 110b having a bore perpendicular to the passive bore, an active hinge leaf 112 having an active bored barrel or barrels 112b, 112c and an active leaf chamfer 112a parallel to the bore. The aforementioned hinge leaves are aligned on their bores such that the chamfers mirror each other and are held together by a hinge pin 114.

A clamp assembly may have a bolt 116 having a threaded shaft 116a and a bolt head 116b. The bolt head 116b is pressed into a socket 118c in a handle 118, with the bolt and handle forming a "T" shape. At one end of the handle is finger loop 118a with its axis parallel to that of the threaded shaft. In some aspects, the finger 118a is a depression in the handle adapted to receive a user's finger such that the user may rotate the handle by inserting a finger into the finger loop 118a moving that finger in a rotary fashion, thereby rotating the handle, and tightening or loosening the bolt. In some aspects, the user may insert a finger into the finger loop, and also apply pressure with the thumb at the thumb pad, allowing the user to physically move the handle, such as when the user is aligning the clamp plate over the hinge leaves. At the end of the handle opposite the finger loop is a flattened thumb pad 118b. An inner washer 120 is inserted between the threaded shaft of the bolt and the sides of the socket. An outer washer 122 is slid over the bolt, seating against the inner washer. A clamp plate 124 is slid over the bolt so that the spring bore 124a faces away from the bolt head. A clamp spring 126 is slid over the bolt and inserted into the spring bore 124a. An eyelet 128 is slid over the threaded shaft so that the eyelet flange 128b rests against the spring and the eyelet skirt 128a is positioned by the threaded shaft and keeps the eyelet flange perpendicular to the axis of the bolt.

The bolt 116 is threaded into the bolt barrel 110b, and the active hinge leaf 112 is rotated until it rests against the passive hinge leaf 110 in order to allow for clamping of the hinge assembly.

A shorter ridge extension 124b and a higher ridge extension 124c parallel each other, extending from the clamp plate on either side of the spring bore. As the bolt is tightened, the clamp plate may be rotated just until the higher ridge extension is constrained by the passive hinge leaf. At this point, a locknut 130 can be screwed onto the bolt 116 until it contacts the back of the bolt barrel 110b.

Continued tightening of the bolt will wedge the hinge leaves in between the ridge extensions 124b, 124c of the clamp plate 124 to create a solidly clamped hinge assembly. The inner faces of the ridge extensions 124b, 124c of the clamp plate have inclined surfaces 124d, 124e that mate with the chamfers on the hinge leaves. The ridges also have grip reliefs 124f, 124g (124g is barely visible opposite 124f) to ensure that clamping pressure is applied more to the extremities of the leaves for maximum stiffness.

The locknut 130 may be a standard Nylon-insert locknut. Other types of locknut may be used, including those that are deformed or swaged so as to hold tightly to their precise position on the bolt.

The bolt 116 may have a head in a form including, but not limited to, a hex head, a five-sided head, a square head, a triangular head, or a "Torx" type head comprising curved surfaces. FIG. 4 shows an embodiment featuring a bolt having a hex head.

In some aspects, the handle 118 is adapted to be able to be removed from the bolt 116 over the head 116b of the bolt by rotation of the handle 118 relative to the head of the bolt 116. This allows for separate storage of the handle 118, but also allows for removal of the handle which makes it much harder to quickly clamp the hinge assembly. For example, a user may want to take the handle away from the folded bicycle to reduce the ease with which a potential thief may be able to assembly the folded bicycle and ride off. The handle 118 has a socket 118c, which, in the case of a hex head, the top resembles a 12-point wrench socket. The underside of this socket opening 118c resembles a six-pointed wrench socket with grooves parallel to its axis. A first plurality of these are through grooves 118d, alternating with a second plurality of blind grooves 118e blocked by landings 118f to constrain the lower face of the bolt head 116c so as to prevent the handle from falling off. A handle with these alternating through and blind grooves is adapted to allow the handle to be slid over the head of the bolt from underneath, when the through grooves are aligned with the points of the head of the bolt. Also, the handle may slid over the bolt head and slightly down the bolt shaft, then the user may rotate the handle slightly such that the points of the bolt head engage upon the blind grooves. As the bolt is tightened further, the underside of the handle 118 puts pressure upon the clamp plate 124 as the points of the bolt head put pressure upon the bottoms of the blind grooves in the handle, trapping the handle under the bolt head as part of the clamped assembly.

Figure 2:
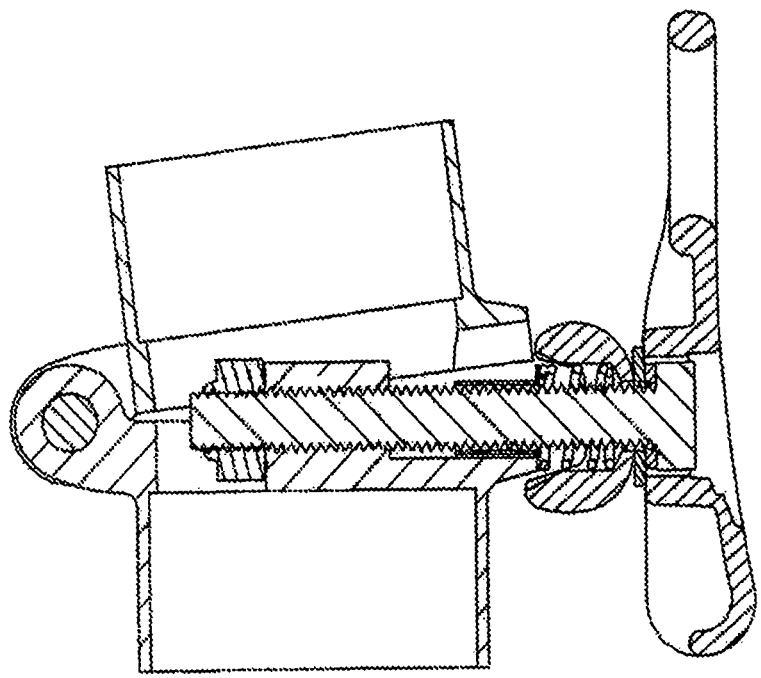
FIG. 2 is a cross-sectional view of the side of the hinge when unlocked.

FIG. 2 shows a configuration of the hinge clamp with the bolt extended and the active leaf free to move between the fully open and closed positions. To unfold the bicycle or other structure from a compact, folded configuration in preparation for use: Starting with the hinge open, as it would be on a bicycle in a folded position, the user would rotate passive hinge leaf 110 on hinge pin 114 against active hinge leaf 112. The user may then place a finger in the finger loop 118a of the handle 118. The user may then rotate the handle clockwise, driving a right-hand threaded bolt 116 against the inner washer 120 and the outer washer 122, and the clamp plate 124 against the clamp spring 126, which is held clear of the hinge leaves by a spring retainer 128, which may be an eyelet. The higher ridge extension 124c on the clamp plate positioned against the passive chamfer prevents the clamp plate from rotating out of alignment with the passive hinge leaf, which might otherwise impede the process. Further rotation of handle brings the inclined plate surfaces 124d, 124e to engage the passive and active leaf surfaces 110a, 112a, drawing them snugly together. By applying a thumb to thumb pad 118b, and forefinger to finger loop 118a, increased pressure may be applied to turn the bolt 116 in the clockwise direction, drawing the clamp plate tightly against hinge leaves, thereby creating a stiff and solidly clamped hinge assembly.

Figure 3:
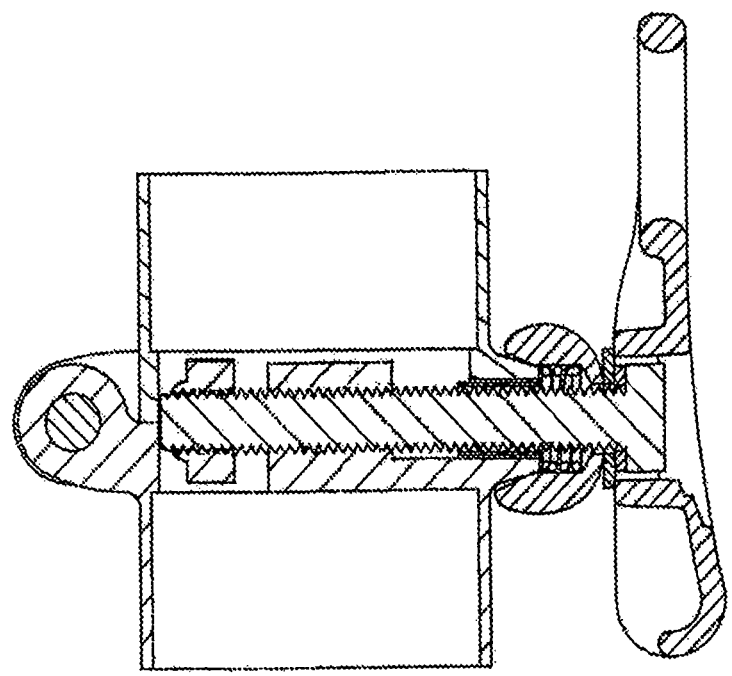
FIG. 3 is a cross-sectional view of the side of the hinge when locked.

FIG. 3 shows leaves pressed together and bolt fully tightened, clamping the hinge leaves together to form a solid structure, with the spring held out by the eyelet skirt and the bolt surrounded by the eyelet in part.

To fold: By applying a thumb to the thumb pad and a forefinger to the finger loop, the operator turns the handle counter-clockwise to relieve the tension holding the hinge leaves together.

Once loose, the handle can be spun counter-clockwise by operator's finger being inserted into the finger loop. As the bolt is retracted, the clamp spring 126 urges the clamp plate away from hinge leaves until the lock nut, semi-permanently affixed to the bolt, contacts bolt barrel, preventing the bolt from further travel. At this point, the higher ridge extension is still constrained by its position against the passive leaf chamfer, but the active hinge leaf clears the lower ridge extension, allowing the hinge to be hinged, and the structure to be folded.

A method to remove or reposition the handle on the hex head bolt shown in FIGS. 4 through 7. A user may choose to mark the bolt head so as to be able to return the handle to the same position or relocate it to another chosen position vis-à-vis the cue 118g when reinstalling it. Turn handle all the way counter-clockwise to withdraw the bolt from the hinge. Push handle towards hinge as far as possible, then turn handle another one-twelfth turn (30°), and withdraw it. Reverse the process to reinstall the handle.

In an example using a six sided bolt, six points of the twelve-point socket cut clear through the handle. This plurality of through grooves has the same shape as the outline of the bolt head, they allow the handle to be pressed down over the bolt head. Turning the handle 30° aligns the head with a second plurality of points or grooves, which are blind grooves, which come in from the top, but stop short at landings congruent with the top surface of the inner washer, capturing the bolt head when it is tightened. The handle 118 is adapted to slide off over the head of the bolt/fastener 116 in a first rotary configuration relative to the bolt, and to be retained under the head of the bolt 116 in a second rotary configuration relative to the bolt.

In this configuration, the installed handle can be pushed towards the end of the bolt away from the head. It can then be rotated to the next set of grooves and slid off for safekeeping, or rotated to a more convenient position and retightened. When handles are removed, they eliminate projections that can snag when the folded bike is being carried by hand or transported in compartments of vehicles. Removing the handles also may prevent a thief from riding the bicycle away unless she or he was supplied with a wrench. The handles are more delicate than the bolt heads, so removing them and carrying them separately would protect them from damage and allow them to be easily replaced. This configuration also simplifies repositioning the handles for convenience or for a neater appearance.

FIG. 4 shows an orientation cue 118g emphasizing alignment along the blind grooves. This provides a visual cue to the operator, who would align the bolt head with that flat to secure it.

The handle described, while bearing a finger loop and thumb pad, may be affixed in a permanent or semi-permanent manner, removable or not removable without first removing all other parts from the bolt. In these cases, convenience might be sacrificed in the interest of simplicity and durability.

In additional embodiments allowing the handle to be removed without removing the bolt, the two may be held together by other means: The handle may be applied from the top or bottom. It may be pressed on, it may be held on by one or more clips, screws, pins, magnets, snap rings, or other means.

Figure 8:
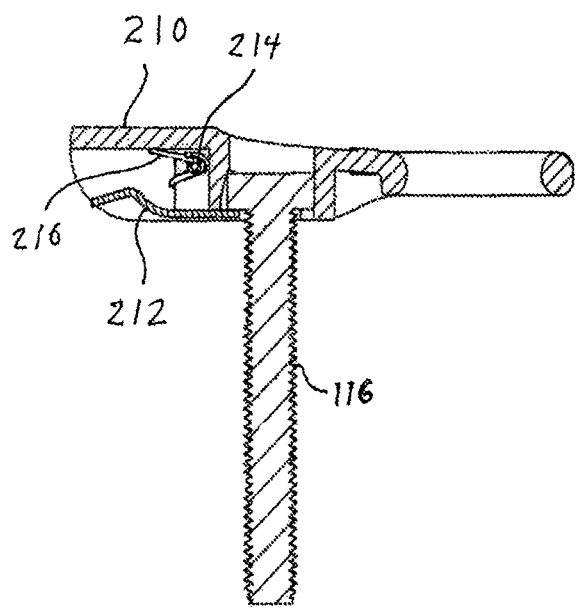
FIG. 8 shows the first alternative handle in operating position
Figure 9:
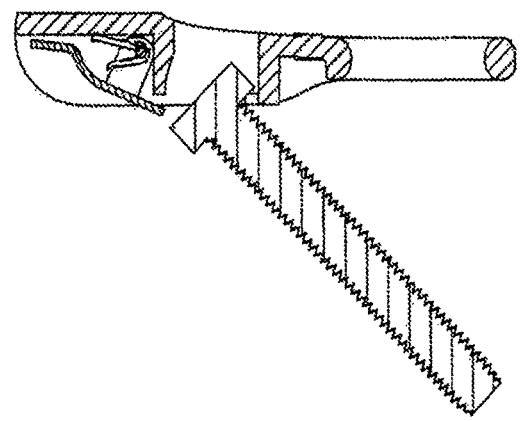
FIG. 9 shows the first alternative handle being removed.

In some embodiments of the present invention, as seen in FIGS. 8 and 9, the handle for clip 210 is held in place on a bolt 200, which may be a square-headed bolt by means of a handle clip 212 which pivots on a clip pin 214 and urged into position by a clip spring 216.

In this configuration, the operator releases the handle by pressing the lever of the clip against the body of the handle. This withdraws the latch from the base of the bolt head, allowing it to rotate out of its socket and be withdrawn. To apply the handle for clip, the operator first hooks the handle landing 210a onto a lower edge of the bolt head 116c. She or he then rotates the finger hole end of the handle until the latch of the clip, urged by the spring, snaps into place. Again, this embodiment allows for the handle to be removed from the bolt over the head of the bolt, but also allows the handle to be captured below the head of the bolt in the clamped position.

Figure 10:
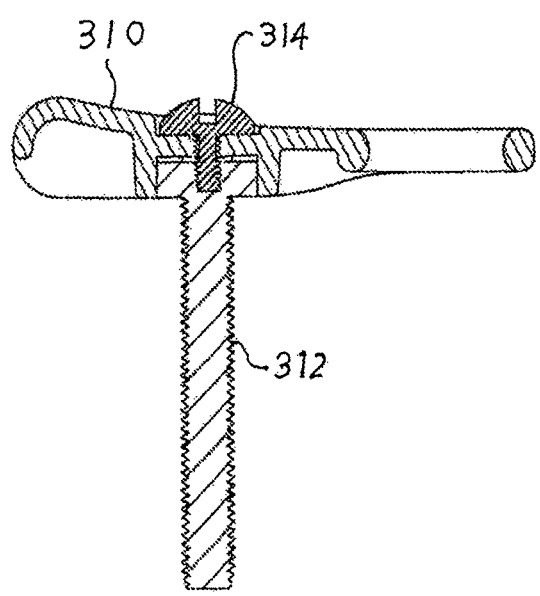
FIG. 10 shows the second alternative handle in operating position.

In some embodiments of the present invention, as seen in FIG. 10, the handle is slipped onto the bolt from outside and held onto the bolt head by a captive screw 314, which is screwed into a threaded bore 312a in the bolt head. The screw is retained by threads 310a in the handle, but is allowed to turn free of the handle by means of an annular groove or neck 314a separating the threaded portion of the captive screw from the screw head. The captive screw may be captured by a circular clip or other means. The screw may be replaced by a snap fitting or other fastening means that allow relatively weak resistance to telescoping, while maintaining firm transmission of rotary force. The screw could have any form of head, including, but not limited to a wing bolt, thumbscrew or hex head. To release the handle in this configuration, the captive screw is unscrewed from the bolt head, driven by a coin or screwdriver if necessary. Once the screw has left the bolt head, and before it is unscrewed from the handle, the handle may be removed.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:
1. A clamp assembly adapted to clamp a hinge assembly of a folding bicycle, said hinge clamp comprising:
   a bolt, said bolt comprising a bolt head;
   a handle coupled to said bolt, said handle comprising a first end and a second end, said handle adapted to turn said bolt, said handle adapted to slide over the bolt head in a first rotary configuration relative to the bolt, said handle to be constrained under the bolt head in a second rotary configuration relative to the bolt; and
   a clamp plate, said clamp plate comprising:
      a central plate portion;
      an upper ridge extension extending from an upper area of said central plate portion;
      a lower ridge extension extending from a lower area of said central plate portion; and
      a hole through said central plate portion.
2. The clamp assembly of claim 1 wherein said handle comprises a first plurality of grooves adapted to allow for the passage of said bolt head through said handle, and a second plurality of blind grooves with landings adapted to receive the exterior of said bolt head against said landings.
3. The clamp assembly of claim 2 further comprising:
   a spring over said bolt between said central plate portion and an eyelet; and
   an eyelet over said bolt, said eyelet comprising a skirt adapted to support said spring along the direction of the bolt.
4. The clamp assembly of claim 1 further comprising:
   a spring over said bolt between said central plate portion and an eyelet; and
   an eyelet over said bolt, said eyelet comprising a skirt adapted to support said spring along the direction of the bolt.

5. The clamp assembly of claim 1 wherein said handle further comprises a finger loop on said first end of said handle.

6. The clamp assembly of claim 5 wherein said handle further comprises a thumb pad on said second end of said handle.

7. A clamp assembly adapted to clamp a hinge assembly of a folding bicycle, said hinge clamp comprising:
 a bolt, said bolt comprising a bolt head;
 a handle coupled to said bolt, said handle comprising a first end and a second end, said handle adapted to turn said bolt, said handle comprising:
  a through hole with a landing adapted to capture the bolt head; and
  a movable clip adapted to move from a first position wherein said through hole captures said bolt head to a second position wherein said bolt head may pass through said through hole; and
 a clamp plate, said clamp plate comprising:
  a central plate portion;
  an upper ridge extension extending from an upper area of said central plate portion;
  a lower ridge extension extending from a lower area of said central plate portion; and
  a hole through said central plate portion.

8. The clamp assembly of claim 7 further comprising:
 a spring over said bolt between said central plate portion and an eyelet; and
 an eyelet over said bolt, said eyelet comprising a skirt adapted to support said spring along the direction of the bolt.

9. The clamp assembly of claim 7 wherein said handle further comprises a finger loop on said first end of said handle.

10. The clamp assembly of claim 9 wherein said handle further comprises a thumb pad on said second end of said handle.

* * * * *